(12) United States Patent
Peng et al.

(10) Patent No.: US 8,400,386 B2
(45) Date of Patent: Mar. 19, 2013

(54) TRANSFLECTIVE LIQUID CRYSTAL DISPLAY DEVICE

(75) Inventors: Xuhui Peng, Shanghai (CN); Zhihua Ling, Shanghai (CN); Xinghua Nie, Shanghai (CN); Sitao Huo, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 261 days.

(21) Appl. No.: 12/866,174

(22) PCT Filed: Feb. 26, 2009

(86) PCT No.: PCT/CN2009/070541
§ 371 (c)(1),
(2), (4) Date: Aug. 4, 2010

(87) PCT Pub. No.: WO2009/109122
PCT Pub. Date: Sep. 11, 2009

(65) Prior Publication Data
US 2010/0321368 A1    Dec. 23, 2010

(30) Foreign Application Priority Data

Mar. 4, 2008  (CN) .......................... 2008 1 0034194

(51) Int. Cl.
*G09G 3/36* (2006.01)
(52) U.S. Cl. .......................... 345/90; 345/205
(58) Field of Classification Search .......... 345/204–215, 345/690–699, 87–104
See application file for complete search history.

(56) References Cited

U.S. PATENT DOCUMENTS 7,362,400 B2 *  4/2008  Itou et al. ..................... 349/141
(Continued)

FOREIGN PATENT DOCUMENTS

| CN | 1176396 C | 11/2004 |
|---|---|---|
| CN | 1766700 A | 5/2006 |

(Continued)

OTHER PUBLICATIONS

European Search Report regarding Application No. 09717315.7-1228, dated Mar. 24, 2011.

(Continued)

*Primary Examiner* — Kent Chang
*Assistant Examiner* — William Lu
(74) *Attorney, Agent, or Firm* — Harness, Dickey & Pierce, P.L.C.

(57) ABSTRACT

A transreflective liquid crystal display device includes an upper substrate (202) on which a color filter is disposed, a lower substrate (201) on which scanning lines and data lines are formed, a liquid crystal layer (206) sandwiched between the upper substrate (202) and the lower substrate (201) and a backlight unit (204) provided on the side of the lower substrate (201) opposite to the liquid crystal layer (206). The lower substrate (201) and the upper substrate (202) are parallel, and the liquid crystal molecules of the liquid crystal layer (206) are arranged parallel the upper substrate (202) when no voltage is applied. A transparent electrode (205) is disposed on the side of the upper substrate (202) faced to the liquid crystal layer (206), and there are comb-shaped electrodes (203) disposed on the side of the lower substrate (201) faced to the liquid crystal layer (206). The comb-shaped electrodes (203) include a first comb-shaped electrode (301) and a second comb-shaped electrode (302) both of which are interdigitated. A method for driving the said display devices is also disclosed.

10 Claims, 5 Drawing Sheets

U.S. PATENT DOCUMENTS

| | | | |
|---|---|---|---|
| 7,460,115 B2 * | 12/2008 | Asao et al. | 345/204 |
| 7,468,719 B2 * | 12/2008 | Kawachi | 345/98 |
| 7,876,304 B2 * | 1/2011 | Lee | 345/102 |
| 2003/0218664 A1 * | 11/2003 | Sakamoto et al. | 347/114 |
| 2003/0222862 A1 * | 12/2003 | Takeuchi et al. | 345/204 |
| 2005/0157231 A1 | 7/2005 | Yang et al. | |
| 2005/0219446 A1 | 10/2005 | Hisatake | |
| 2006/0221426 A1 * | 10/2006 | Miles | 359/237 |
| 2007/0024789 A1 | 2/2007 | Itou et al. | |
| 2007/0121047 A1 | 5/2007 | Chung et al. | |
| 2007/0146606 A1 | 6/2007 | Yamashita | |
| 2007/0153196 A1 | 7/2007 | Jang et al. | |
| 2007/0176872 A1 | 8/2007 | Kazuyoshi et al. | |
| 2007/0236635 A1 | 10/2007 | Morimoto et al. | |
| 2008/0068523 A1 | 3/2008 | Mitsui et al. | |
| 2008/0180385 A1 * | 7/2008 | Yoshida et al. | 345/102 |
| 2009/0244426 A1 * | 10/2009 | Hasegawa et al. | 349/48 |

FOREIGN PATENT DOCUMENTS

| | | |
|---|---|---|
| CN | 1975518 A | 6/2007 |
| CN | 1991461 A | 7/2007 |
| CN | 1991466 A | 7/2007 |
| CN | 101149540 A | 3/2008 |
| JP | 9061842 A | 3/1997 |
| JP | 2005292586 A | 10/2005 |
| JP | 2005292709 A | 10/2005 |
| JP | 2007034151 A | 2/2007 |
| KR | 20030091758 | 12/2003 |
| WO | WO-2008010333 A1 | 1/2008 |

OTHER PUBLICATIONS

First Korean Office Action regarding Application No. 10-2010-7018212, issued Dec. 27, 2011. Translation provided by Unitalen Attorneys At Law.

* cited by examiner

TRANSFLECTIVE LIQUID CRYSTAL DISPLAY DEVICE

This application claims the benefit of Chinese Application No. 200810034194.1, filed with the Chinese Intellectual Property Office on Mar. 4, 2008, entitled "Transflective Liquid Crystal Display Device", the overall disclosure of which is hereby incorporated herein by reference.

FIELD OF INVENTION

The present invention generally relates to a liquid crystal display device, and more particularly to a dual purpose transflective liquid crystal display which is capable of switching between a transmission mode and a reflective mode.

BACKGROUND OF THE INVENTION

The liquid crystal display (LCD) devices may be generally classified into transmission type liquid crystal display device and reflective type liquid crystal display device. The transmission type LCD device has a backlight as light source therein (or referred to backlight source). The reflective type LCD device has a reflective film therein, the reflective film functions as a light source by reflecting the external light incident into the LCD device. The reflective type LCD device has the advantages of lower power consumption, lighter weight and thinner thickness due to there is no backlight source. On the other hand, the transmission type LCD device can display well in dark environments because it has a light source therein.

The transmission type LCD device also has advantages of displaying with high brightness and high contrast, because it displays using the light from the backlight source and is not affected by ambient light, however the backlight source may cause more power consumption. Moreover, in a very bright environment, such as outdoor in a sunny day, lower resolution or the further increase power consumption resulted by maintaining the resolution through increasing the brightness of the backlight source may occur in the transmission type LCD device.

The reflective type LCD device has the advantages of extremely low power consumption due to it has no backlight source, however its displaying brightness and contrast is significantly impacted by operation environment such as the ambient brightness. Especially, the reflective type LCD device has the disadvantages of extremely low resolution in a dark operation environment.

Nowadays, there is a kind of LCD device called transflective LCD device which has the advantages of both the reflective type LCD device and the transmission type LCD device. In one pixel region of the transflective type LCD device, there are a reflective pixel electrode used to reflect the light from the environment and a transmission pixel electrode used to transmit the light from the backlight source, so that switching between the transmission display mode and the reflective display mode can be operated according to various operation environments, or display can be perform in both modes at the same time. Therefore, the transflective LCD device has both the advantage of lower power consumption of the reflective type LCD device, and less affect by ambient brightness and display in high brightness and high contrast of the transmission type LCD device. Also, the disadvantage of the resolution reduction of the transflective LCD device in a very bright environment, such as outdoor in a sunny day, can be effectively depressed.

In the prior art, an In Plane Switching (IPS) display mode technology has been proposed in order to improve the viewing angle properties of the liquid crystal cell. FIG. 1 shows an exiting LCD device adopting IPS display mode. The LCD device includes an upper glass substrate 101, a lower glass substrate 102, a transparent comb-shaped tin indium oxide (ITO) electrode 103 attached to the lower glass substrate 102 and located corresponding to a transmission region, and a liquid crystal layer 104 sandwiched between the upper glass substrate 101 and the lower glass substrate 102. A lateral electric field parallel to the substrates is generated by applying a voltage to the comb-shaped ITO electrode 103, so that the liquid crystal molecules rotate in a plane parallel to the substrates under the effect of the electric field and the LCD display the images and obtain a wider viewing angle.

For the transflective LCD device adopting IPS mode, in order to make the electro-optic curves of the transmission regions and the reflective regions consistent, an organic film is typically provided in the reflective regions of the transflective LCD device, wherein the thickness of the organic film is set, so that the thickness of the liquid crystal layer in the reflective regions is half of that in the transmission regions. Therefore, comb-shaped electrodes need to be made in the transmission regions and the reflective regions respectively, which increases the process difficulty, and impacts on the yield rate largely. If the transflective LCD device adopting IPS display mode is made to be a single cell gap, in order to make the electro-optic curves of the transmission regions and the reflective regions consistent, it is necessary to control the transmission regions and the reflective regions, respectively, and thus two thin film transistors (TFT) must be used, which increases the process difficulty and the cost of the product.

In view of the problems above, it is intended to provide a transreflective LCD device without a dual cell gap or two TFTs for the transmission regions and the reflective regions respectively, which can be switched between various modes depending on different intensities of the environment light, and thus the process will be simplified and the cost will be reduced.

SUMMARY OF THE INVENTION

The present invention is proposed to resolve above problems, an object of the invention is to provide a liquid crystal display device and a driving method thereof, the liquid crystal display device displays in a transmission mode when the environment light is weak, and displays in a reflective mode when the environment light is strong, and it is unnecessary to have a dual cell gap or two TFTs disposed in the transmission region and the reflective region, respectively, and thus the process will be simplified and the cost will be reduced.

To achieve the object and advantages of the present invention, the liquid crystal display device according to the invention includes: an upper substrate on which color filters are disposed; a lower substrate parallel to the upper substrate on which scanning lines and data lines are formed; a liquid crystal layer sandwiched between the upper substrate and the lower substrate; and a backlight unit provided on a surface of the lower substrate opposite to the liquid crystal layer, wherein a transparent electrode is disposed on the upper substrate, comb-shaped electrodes are formed on the lower substrate, and the comb-shaped electrode includes a first comb-shaped electrode and a second comb-shaped electrode which are interdigitated.

According to one aspect of the present invention, a transmission display mode may be performed when a voltage is applied to the first comb-shaped electrode and the second comb-shaped electrode of the comb-shaped electrode, and a reflective display mode may be performed when a voltage is applied to the transparent electrode on the upper substrate and the first comb-shaped electrode and the second comb-shaped electrode on the lower substrate.

According to one aspect of the present invention, the first comb-shaped electrode and the second comb-shaped electrode on the lower substrate are both reflective electrodes.

According to one aspect of the present invention, one of the first comb-shaped electrode and the second comb-shaped electrode on the lower substrate is a reflective electrode and the other is a transparent electrode.

According to another aspect of the present invention, the transparent electrode may be any one of ITO electrode, IZO electrode and IGO electrode or a combination thereof.

To achieve the object and advantages of the present invention, a method for driving the liquid crystal display according to the invention includes steps of: floating a second comb-shaped electrode (or a first comb-shaped electrode), using the opaque electrode of the comb-shaped electrode as a reflective layer, and applying different voltages to the first comb-shaped electrode and the transparent ITO electrode on the upper substrate to generate an electric field perpendicular to the substrate between the first comb-shaped electrode and the transparent ITO electrode by which the liquid crystal molecules rotate in a plane perpendicular to the upper substrate, such that an reflective display mode with excellent viewing angle may be achieved by the liquid crystal device when the external light is strong; floating a transparent ITO electrode on the upper substrate, applying different voltages to the first comb-shaped electrode and the second comb-shaped electrode to generate an electric field parallel to the upper substrate between the first comb-shaped electrode and the second comb-shaped electrode by which the liquid crystal molecules rotate in a plane parallel to the upper substrate, such that an transmission display mode with wide viewing angle may be achieved by the liquid crystal device when the external light is dark.

The transreflective LCD device according to the present invention may switch between various modes depending on different intensities of the environment light, and for which it is unnecessary to have a dual cell gap and two TFTs disposed in the transmission region and the reflective region, and thus the process will be simplified and the cost will be reduced.

DESCRIPTION OF THE PREFERRED EMBODIMENTS

The embodiments of the present invention will be described in detail with reference to the accompanying drawings in which examples are shown.

Figure 1:
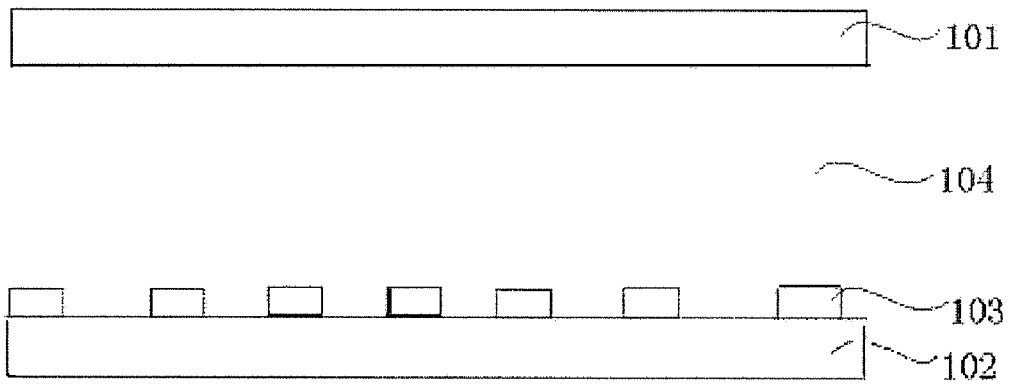
FIG. 1 shows an exiting liquid crystal display device adopting IPS display mode in the prior art.
Figure 2:
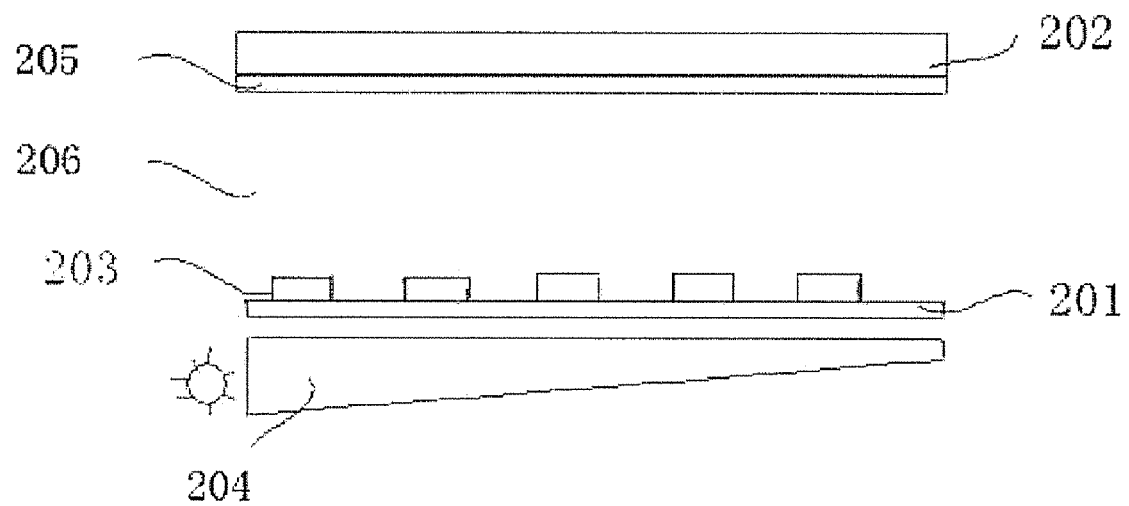
FIG. 2 shows a structure diagram of a liquid crystal display device according to the present invention.
Figure 3:
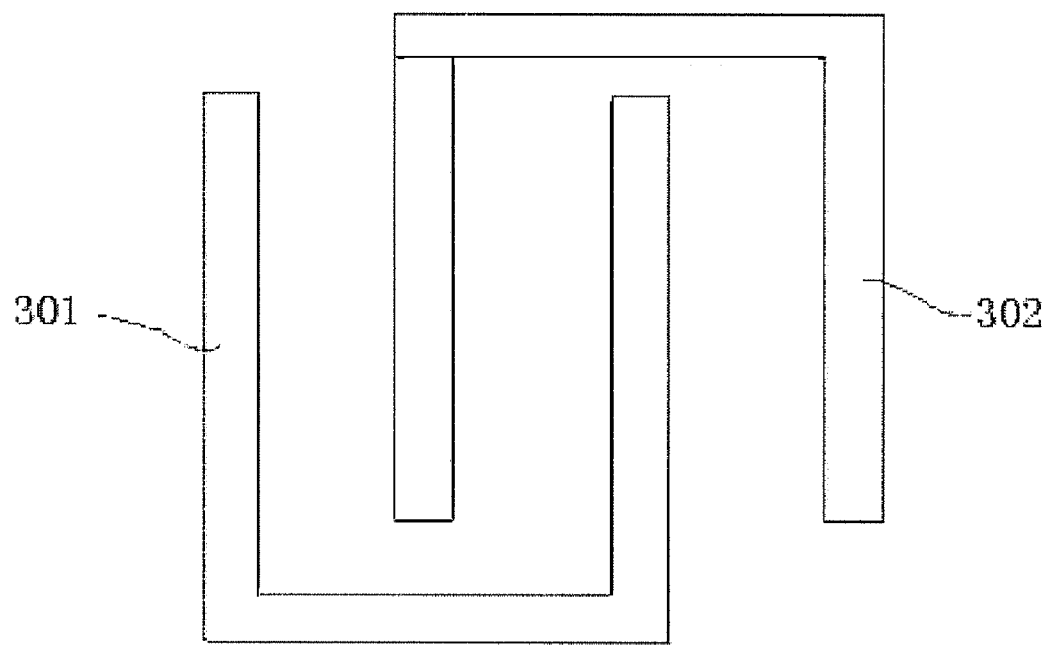
FIG. 3 is a top view of the comb-shaped electrode 203 in the liquid crystal display device according to the present invention.

FIG. 2 shows a structure diagram of a liquid crystal display device according to the present invention. The liquid crystal display device in FIG. 2 includes an upper substrate 202, a transparent ITO electrode 205 disposed on a surface of the upper substrate 202 facing the liquid crystal layer, a color filter (not shown in FIG. 2) disposed on the upper substrate 202, a lower substrate 201 parallel to the upper substrate 202, a comb-shaped electrode 203 disposed on a surface of the lower substrate 201 facing the liquid crystal layer, scanning lines and data lines (not shown in FIG. 2) disposed on the lower substrate 201, a liquid crystal layer 206 with positive Dielectric Constant sandwiched between the upper substrate and the lower substrate, wherein the molecules of liquid crystal layer 206 is arranged parallel to the upper substrate when no voltage is applied, and a backlight unit 204 disposed adjacent a surface of the lower substrate opposite to the liquid crystal layer. FIG. 3 is a top view of the comb-shaped electrode 203. As shown in FIG. 3, the comb-shaped electrode 203 includes a first comb-shaped electrode 301 and a second comb-shaped electrode 302 which are interdigitated, both the first comb-shaped electrode 301 and the second comb-shaped electrode 302 are reflective electrodes, or one of the first comb-shaped electrode and the second comb-shaped electrode of the lower substrate is a reflective electrode, and the other is a transparent electrode. The transparent electrode may be an ITO electrode, an IZO electrode, or an IGO electrode, or a combination thereof. As embodiments disclosed below, the invention will be described by taking both the first comb-shaped electrode 301 and the second comb-shaped electrode 302 as reflective electrodes.

Hereinafter, embodiments of the liquid crystal display and a driving method for the liquid crystal display according to the present invention will be explained in detail.

Figure 4:
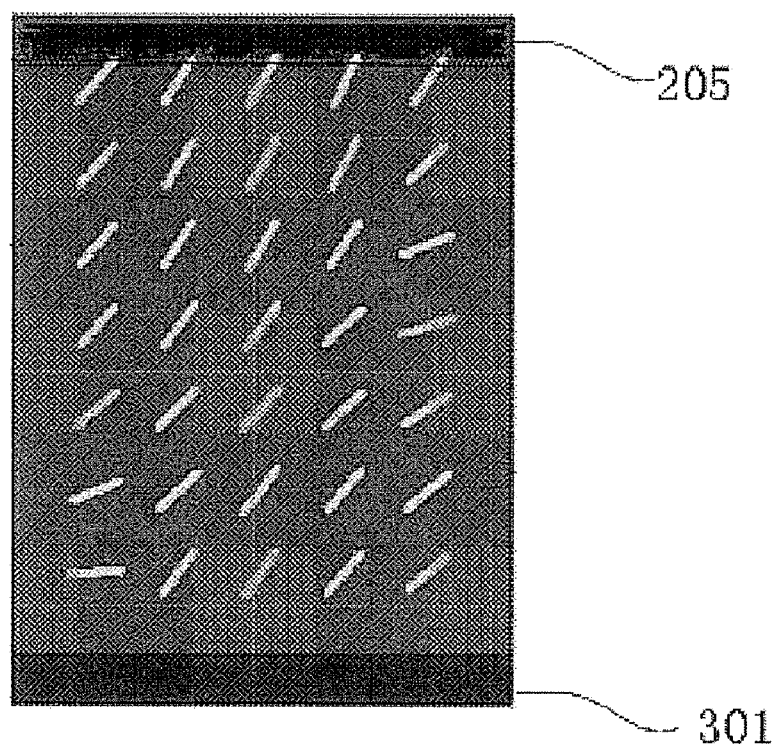
FIG. 4 is a sectional view of the liquid crystal molecules distribution in the reflective display mode wherein voltages are applied to the opaque first comb-shaped electrode 301 and the transparent ITO electrode 205 of the upper substrate in the liquid crystal display device according to the present invention.

FIG. 4 is a sectional view of the liquid crystal display device according to the present invention. FIG. 4 shows the distribution of liquid crystal molecules when the liquid crystal display device is operated in the reflective display mode wherein voltages are applied to the opaque first comb-shaped electrode 301 and the transparent ITO electrode 205. Referring to FIGS. 2-3, in the reflective display mode, the second comb-shaped electrode 302 (or the first comb-shaped electrode 301) is floated, the comb-shaped electrode 203 is used as a reflective layer, and different voltages are applied to the first comb-shaped electrode 301 and the transparent ITO electrode 205 on the upper substrate to generate an electric field perpendicular to the upper substrate 202 between the first comb-shaped electrode 301 and the transparent ITO electrode 205 by which the liquid crystal molecules rotate in a plane perpendicular to the substrate 202, so that an reflective display mode with excellent displaying effect may be achieved by the liquid crystal device when the ambient light is strong.

Figure 5:
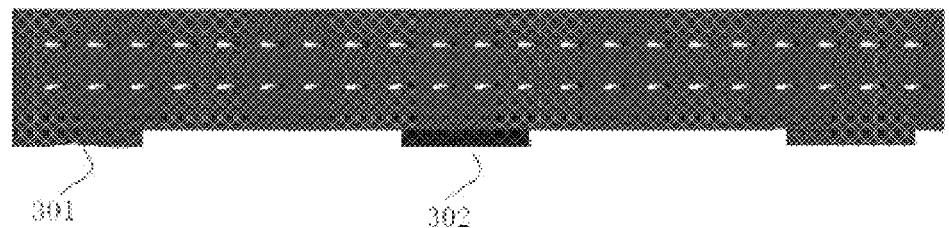
FIG. 5 is a sectional view of the electrode structure of the lower substrate and the liquid crystal distribution in the liquid crystal display device according to the present invention when no voltage is applied.
Figure 6:
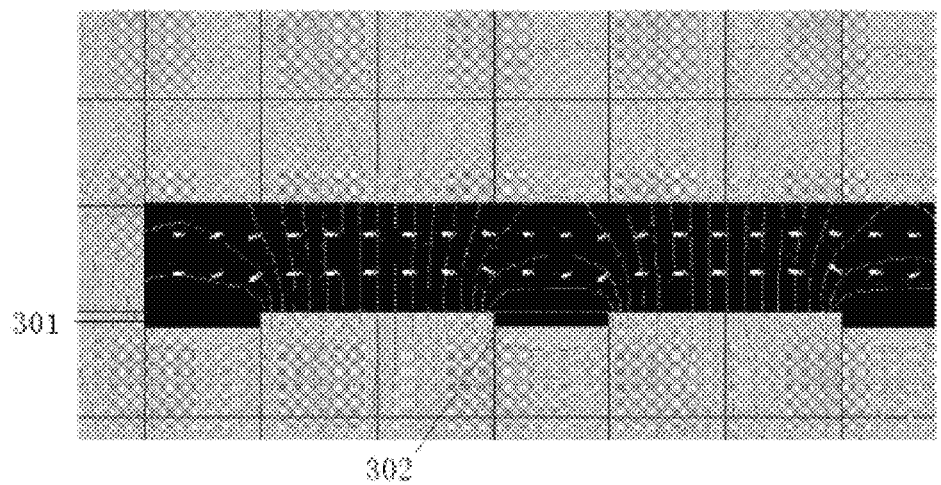
FIG. 6 is a distribution view of the liquid crystal molecules and the electric field lines in the liquid crystal display device according to the present invention when different voltages are applied to the first comb-shaped electrode 301 and the second comb-shaped electrode 302.

FIG. 5 is a sectional view of the electrode structure of the lower substrate and the liquid crystal distribution in the liquid crystal display device according to the present invention when no voltage is applied. FIG. 6 is a distribution view of the liquid crystal molecules and the electric field lines in the liquid crystal display device according to the present invention when different voltages are applied to the first comb-shaped electrode 301 and the second comb-shaped electrode 302. As shown in these figures, the transparent ITO electrode on the upper substrate (not shown in the Figures) is floated, different voltages are applied to the first comb-shaped electrode 301 and the second comb-shaped electrode 302 to generate an electric field parallel to the upper substrate 202 between the first comb-shaped electrode 301 and the second comb-shaped electrode 302 by which the liquid crystal molecules rotate in a plane parallel to the upper substrate 202, so that a transmission display mode with excellent displaying effect and wide viewing angle may be achieved by the liquid crystal device when the ambient light is weak.

Figure 7:
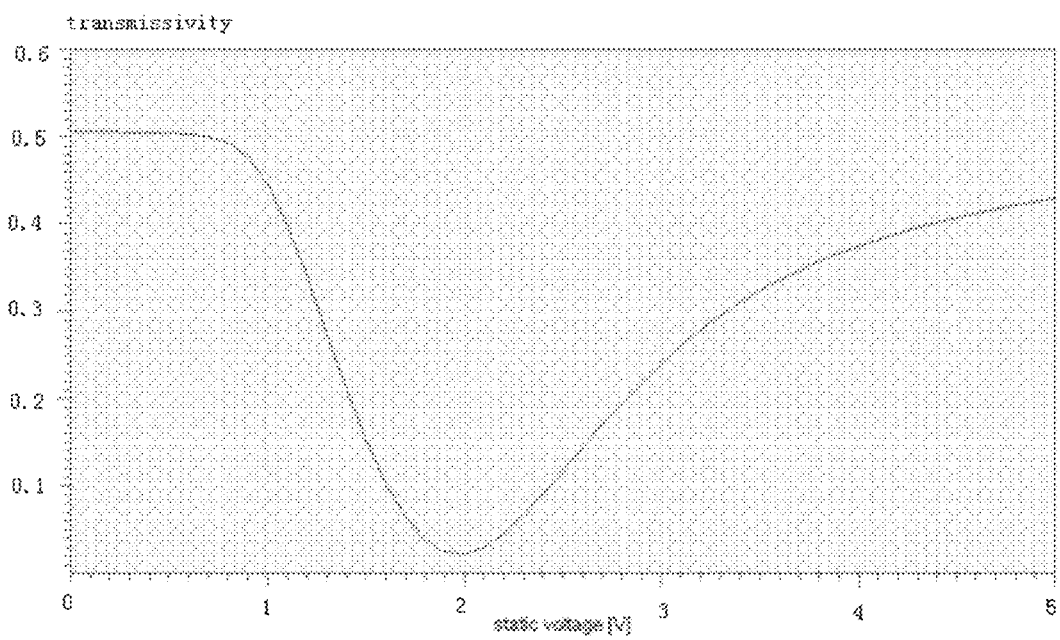
FIG. 7 is an electro-optic graph when the liquid crystal display device according to the present invention is operated in the reflective display mode shown in FIG. 4.
Figure 8A:
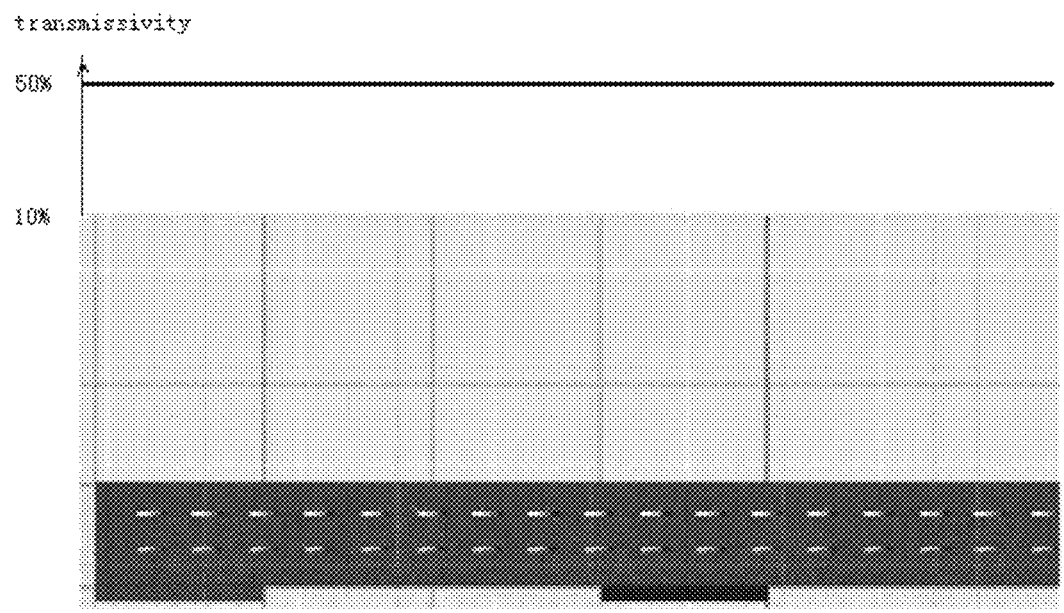
FIGS. 8a-8c are electro-optic graphs when the liquid crystal display device according to the present invention is operated in the transmission display mode shown in FIG. 6 wherein different voltages are applied to the first comb-shaped electrode 301 and the second comb-shaped electrode 302.
Figure 8B:
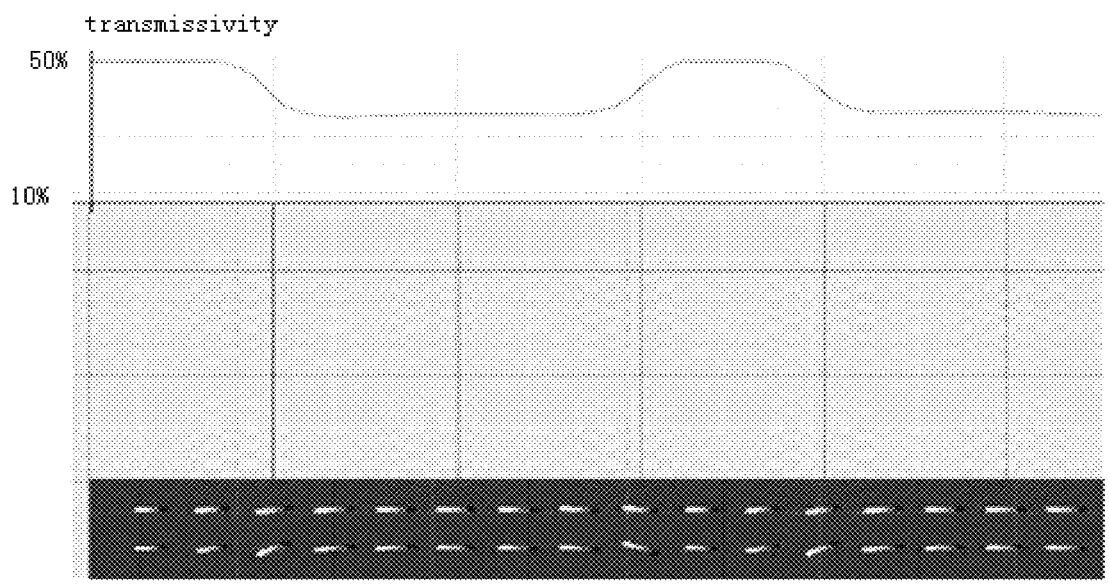
Figure 8C:
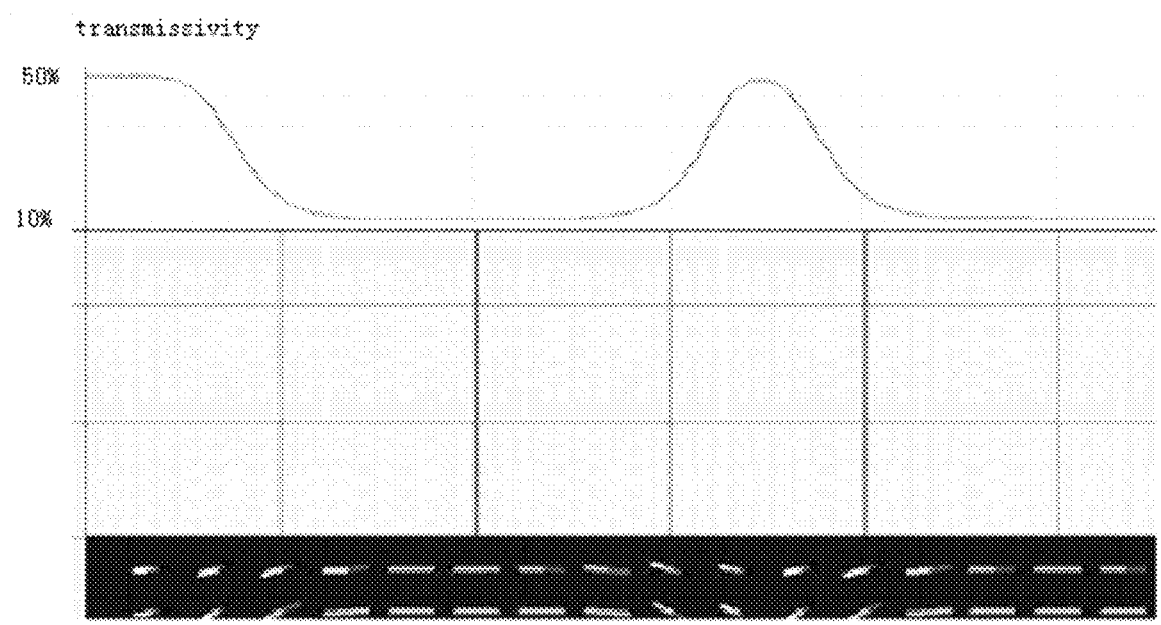

FIG. 7 is an electro-optic graph of the liquid crystal display device when the liquid crystal display device according to the present invention is operated in the reflective display mode shown in FIG. 4. FIGS. 8a-8c are electro-optic graphs of the liquid crystal display device when the liquid crystal display device of the present invention is operated in the transmission display mode shown in FIG. 6 wherein different voltages are applied between the first comb-shaped electrode 301 and the second comb-shaped electrode 302. FIG. 8a is an electro-optic graph of the liquid crystal display device and an arrangement view of liquid crystal molecules in the case of the transmission display mode when no voltage is applied. FIG. 8b is an electro-optic graph and an arrangement view of liquid crystal molecules in the case of the transmission display mode when a moderate voltage is applied. FIG. 8c is an electro-optic graph and an arrangement view of liquid crystal molecules in the case of the transmission display mode when a strongest voltage of 5V is applied. In the numeric simulation for both the reflective display mode and the transmission display mode, the liquid crystal cell gap thickness d=2.75 μm may be obtained according to the optical equation $\Delta nd=\lambda/2$, wherein the wavelength $\lambda=550$ nm and the liquid crystal birefringence $\Delta n=0.1$. Meanwhile, two polarizers are disposed on the upper side and the lower side of the liquid crystal cell, respectively, so that the absorbing axes thereof are at an angle of 45 degree with respect to long axis of the liquid crystal molecules, and absorbing axes of the two polarization planes (not shown in figures) are orthogonal to each other.

In this embodiment, as shown in FIG. 6, when the liquid crystal display device of the present invention is operated in the transmission display mode, the biggest voltage difference between the first comb-shaped electrode 301 and the second comb-shaped electrode 302 on the lower substrate is 5V, and the electro-optic graph is a graph in a normally white display mode. As shown in FIG. 4, in the reflective display mode, the biggest voltage difference between the first comb-shaped electrode 301 on the lower substrate and the ITO electrode 205 on the upper substrate is 2V, and the electro-optic graph is also a graph in a normally white display mode. Therefore, a transreflective liquid crystal display device with excellent display effect can be implemented wherein the transmission display mode and the reflective display mode are both normally white display mode, so long as the range of voltage is properly selected.

The advantages of the present invention can be understood according to the embodiments of the present invention, that is, a transreflective liquid crystal display with excellent display effect under various intensities of various ambient lights can be implemented by selecting different display modes, and it is unnecessary to have a dual cell gap or to have two TFTs disposed in the transmission region and the reflective region of a single pixel, respectively. Thus the process of manufacturing the liquid crystal display will be simplified and the cost will be reduced. Furthermore, the process may be simplified due to a more simple structure of the transreflective liquid crystal display, and a high yield rate of the transreflective liquid crystal display is achieved.

Although the invention is described through preferred embodiments, those ordinarily skilled in the art should appreciate that the scope of the present application is not intended to be limited to the preferred embodiments and the invention includes all such modifications and alterations which fall within the scope of the appended claims and the substitutions.

What is claimed is:

1. A transreflective liquid crystal display device comprising:
    an upper substrate on which color filters are disposed;
    a lower substrate parallel to the upper substrate on which scanning lines and data lines are formed;
    a liquid crystal layer sandwiched between the upper substrate and the lower substrate, wherein liquid crystal molecules of the liquid crystal layer are arranged parallel to the upper substrate when no voltage is applied; and
    a backlight unit provided on a surface of the lower substrate opposite to the liquid crystal layer,
    wherein a transparent electrode is disposed on a surface of the upper substrate facing the liquid crystal layer, comb-shaped electrodes are disposed on a surface of the lower substrate facing the liquid crystal layer, and the comb-shaped electrodes include a first comb-shaped electrode and a second comb-shaped electrode which are interdigitated;
    wherein the transreflective liquid crystal display device is adapted to perform a transmission display mode by applying a voltage between the first comb-shaped electrode and the second comb-shaped electrode to generate an electrical field parallel to the upper substrate in the liquid crystal layer; and
    wherein the transreflective liquid crystal display device is adapted to perform a reflective display mode by applying a voltage to one reflective electrode of the comb-shaped electrodes and the transparent electrode to generate an electrical field perpendicular to the upper substrate in the liquid crystal layer.

2. The transreflective liquid crystal display device according to claim 1, wherein both the transmission display mode and the reflective display mode are normally white display mode.

3. The transreflective liquid crystal display device according to claim 1, wherein one of the first comb-shaped electrode and the second comb-shaped electrode is a reflective electrode and the other is a transparent electrode.

4. The transreflective liquid crystal display device according to claim 1, wherein both the first comb-shaped electrodes and the second comb-shaped electrode are reflective electrodes.

5. The transreflective liquid crystal display device according to claim 1, wherein the transparent electrode on the upper substrate may be any one of ITO electrode, IZO electrode, and IGO electrode or a combination thereof.

6. A method for driving a transreflective liquid crystal display device, the transreflective liquid crystal display device comprising:
- an upper substrate on which color filters are disposed;
- a lower substrate parallel to the upper substrate on which scanning lines and data lines are formed;
- a liquid crystal layer sandwiched between the upper substrate and the lower substrate, wherein liquid crystal molecules of the liquid crystal layer are arranged parallel to the upper substrate when on voltage is applied; and
- a backlight unit provided on a surface of the lower substrate opposite to the liquid crystal layer,
- wherein a transparent electrode is disposed on a surface of the upper substrate faced to the liquid crystal layer, comb-shaped electrodes are disposed on a surface of the lower substrate faced to the liquid crystal layer, and the comb-shaped electrodes include a first comb-shaped electrode and a second comb-shaped electrode which are interdigitated, the method comprising the steps of:
- applying a voltage to the first comb-shaped electrode and the second comb-shaped electrode to generate an electric field parallel to the upper substrate by which a transmission display mode is performed; and
- applying a voltage to the transparent electrode on the upper substrate and one reflective electrode of the comb-shaped electrodes to generate an electric field perpendicular to the upper substrate by which a reflective display mode is performed.

7. The method for driving a transreflective liquid crystal display device according to claim 6, wherein both the first comb-shaped electrode and the second comb-shaped electrode are reflective electrodes.

8. The method for driving a transreflective liquid crystal display device according to claim 6, wherein one of the first comb-shaped electrode and the second comb-shaped electrode is a reflective electrode and the other is a transparent electrode.

9. The method for driving a transreflective liquid crystal display device according to claim 6, wherein both the transmission display mode and the reflective display mode are normally white display mode.

10. The method for driving a transreflective liquid crystal display device according to claim 6, wherein the transparent electrode on the upper substrate may be any one of ITO electrode, IZO electrode, and IGO electrode or a combination thereof.

* * * * *